May 12, 1970            J. G. FARRAR            3,512,154

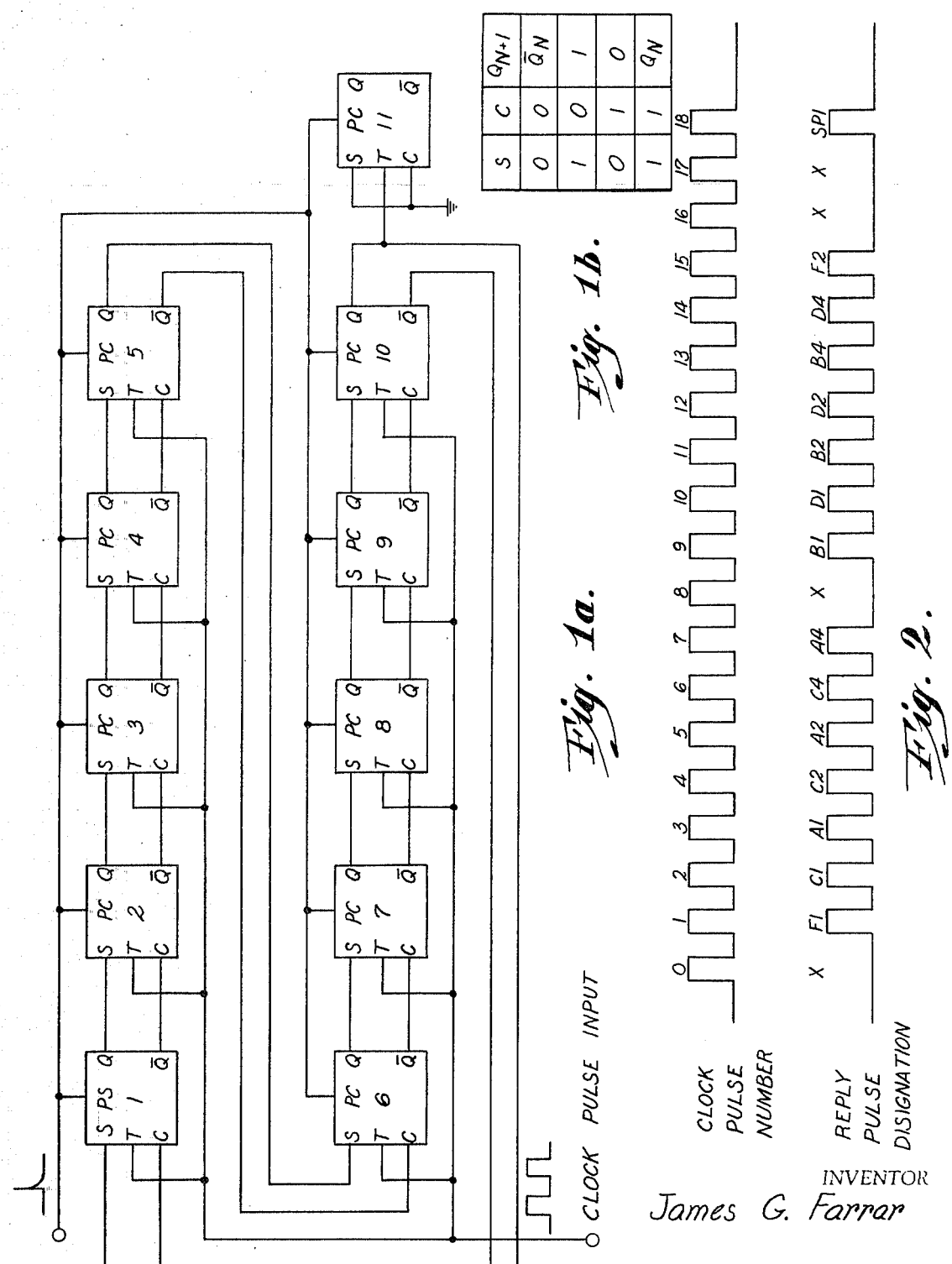

METHOD AND APPARATUS FOR TRANSPONDER ENCODING

Filed Aug. 5, 1968            3 Sheets-Sheet 3

INVENTOR
James G. Farrar

United States Patent Office 3,512,154
Patented May 12, 1970

3,512,154
METHOD AND APPARATUS FOR TRANSPONDER ENCODING
James G. Farrar, Lee's Summit, Mo., assignor to King Radio Corporation, Olathe, Kans., a corporation of Kansas
Filed Aug. 5, 1968, Ser. No. 750,145
Int. Cl. G01s 9/56
U.S. Cl. 343—6.8                                13 Claims

ABSTRACT OF THE DISCLOSURE

The Transponder encoding section uses RTL (resistor-transistor-logic) to perform the encoding functions thereof. A series of clock pulses determines the system timing in that the basic time between clock pulses is 1.45 microseconds. This system timing corresponds to the timing of the reply coding. A shift register, which is constructed to count through its capacity twice during the encoding of each individual number, correlates the code set in the control head or from an altimeter digitizer with the selected information pulses. The RTL provides suitable gating in combination with the shift register to enable the transmitter to send the proper code.

BACKGROUND AND BRIEF DESCRIPTION OF THE INVENTION

The subject transponder and other related transponders are constructed and designed for use in an Air Traffic Control Radar Beacon System. In the aircraft, the transponder functions to transmit a coded response to a coded interrogation which has previously been transmitted by an air traffic control ground radar station.

There are two types of radar at each ATC ground station. The first, usually referred to as the Primary Surveillance Radar (PSR) operates on the normal radar principle of receiving energy reflected from the aircraft under surveillance. The second, called the Secondary Surveillance Radar (SSR), operates on the coded reply from the airborne transponder, both radars are used in conjunction to develop the total air traffic situation and to display it on a single radar scope.

The typical transponder referred to above, is made up of four basic, yet interrelated, units. They are the receiver, the decoder, the encoder, and the transmitter. The receiver receives the transmitted signal from the ground station and turns it into detected video signals before delivering same to the decoder. As a general rule, the SSR interrogates the transponder in one of two modes. These modes are referred to as Mode A or Mode C interrogations. The decoder operates to examine the interrogation pulse pairs from the SSR and provides information to the encoder section by essentially telling it to encode either a Mode A reply or a Mode C reply.

My transponder replies to both the Mode A and Mode C interrogations with a coded pulse group on the carrier of 1090±3 MHz. In a Mode A reply, the coding of the pulses represents an identification number of the aircraft carrying the transponder. The transmitted identification number is inserted in the transponder by means of manually operated select knobs on the control head. This number consists of four octal digits (0–7) which gives the transponder the capability of 4096 different identification numbers. The coding of a Mode A reply can consist of up to 15 pulses. Twelve of these pulses carry an identification number. The other two, called framing pulses (F1 and F2, see FIG. 2) come before and after the twelve information pulses; the last pulse is a special identification pulse (SPI) to aid the radar operator.

In the Mode C reply, the same type of coding characteristic is used, but the twelve information pulses contain altitude information. The altitude information is supplied to the transponder from altitude digitizers, all of various designs.

Referring now to FIGS. 5a and 5b, FIG. 5a represents the typical identification numbers which may be inserted into a transponder control head. These numbers are categorically represented by the letters A, B, C and D. The FIG. 5b is a state or truth table that shows how the octal numbers (0 through 7) are transferred into three binary numbers which have the state 0 or 1. These three binary numbers are referred to as A1, A2, and A4, and as will be seen later, correlate to the reply pulse designation similarly identified in FIG. 2. While FIG. 5b represents a single truth table that corresponds to the A numbers, it should be understood that a similar table relates to the B, C, and D numbers of the reply code.

The basic function of the subject encoding circuitry is to take a series of clock pulses, which determines the system timing, and encode a complete reply to be transmitted to the interrogator. As suggested above, these replies consist of at least two and up to as many as fifteen (15) pulses. The two pulses that are always transmitted are called framing pulses (F1 and F2). In timed sequence, these two pulses appear before and after, respectively, the twelve (12) pulses C1, A1, C2, A2, C4, A4, B1, D1, B2, D2, B4, and D4, which contain information that is to be transmitted to the ground interrogator (see FIG. 2). As also suggested above, with reference to Truth Table, FIG. 5b, these twelve (12) pulses are converted into binary digits that represent four octal numbers that correspond to the control head identification number.

The immediate technical problem in the subject encoding section is to (1) determine which reply pulse corresponds to the now present clock pulses; and (2) determine if that pulse is to be transmitted in a Mode A or a Mode C reply; and allow only the mode that is to be transmitted to trigger the transmitter. Prior art encoding sections accomplished the above functions in various ways. For example, five flip-flop circuits have been used as a binary count down circuit because of the nineteen (0 through 18) distinct states that had to be determined: (see FIG. 2 and note that there are four spaces for possible additional informational pulses that are indicated as X, thus the 19 states, supra). These flip-flops or binary variables were combined with encoding matrix which examined the states of the five flip-flops in order to separate out a particular pulse which corresponded to a particular pulse in the clock pulse train. The selected pulse would then be allowed to trigger the transmitter in the transponder.

Another transponder encoding scheme utilized a passive delay line which had taps every 1.45 microseconds along the length thereof. A pulse inserted at the input end of the delay line would appear at the various taps after having been delayed a time corresponding to the length of the line itself. Thus, the first tap would be transmitting the F1 pulse, while the second tap corresponding to the C1 pulse would interconnect with a gate to determine whether or not a C1 pulse was selected by the control head for transmitter triggering.

The use of shift registers eventually replaced the passive delay line encoder circuits and generally comprise a series of interconnected flip-flop circuits which utilize a basic timing signal to step down the register. All of the above-mentioned methods and encoding circuits could be made to satisfactorily perform the encoding function however one of the primary disadvantages of each method is attributable to the large number of components needed to perform each method and the inherent cost factor associated therewith. Also the accuracy and stability of the above was oftentimes found wanting.

One of the objects of my invention is to construct and provide an accurate and highly reliable encoding section for a transponder. It is an important feature of this invention that the number of component parts needed to perform the encoding function has been significantly reduced thereby reducing the overall cost of the transponder.

Another object of my invention is to provide in a transponder of the character described, an encoding section which is comprised of a shift register that counts through its capacity twice for encoding the proper code to be transmitted.

Another object of my invention is to provide a transponder encoding section that operates to trigger a transmiter in timed sequence with the leading edge of a reference clock pulse. It follows that he basic timing of the transmitter is more accurate and reliable since the clock pulse utilized herein is a periodic recurring wave at the basic system time.

A further object of my invention is to provide an encoding circuit for a transponder that is constructed almost completely of RTL (resistor-transistor-logic) circuitry. As a result, the entire encoding function of the transponder may be done with basic integrated circuits which takes up less space, reduces the cost of the unit, and offers advantages in accuracy, ruggedness and trouble free usability.

A further object of my invention is to provide a panel mounted transponder using RTL circuitry for the encoding section thereof. Correlary thereto, the number of active components needed to perform the encoding function may be reduced since a closed series contact may be used in performing the encoding function rather than the conventional "grounded line" encoding operations. Since there has been a substantial reduction of parts, elements size and weight, my transponder may be panel mounted and constructed to allow the routing of pulses to the control head as apposed to the utilization of a remote unit with the pulses running a considerable length from a remote box and thusly requiring the grounding of additional control wires for the encoding functions thereof. Alternately, the more conventional utilization of same may be accomplished in a remote position within the aircraft.

Other and further objects and advantages of the invention, together with the features of novelty appurtenant thereto, will appear in the course of the following description.

DETAILED DESCRIPTION

In the accompanying drawings, which form a part of the specification and are to be read in conjunction therewith, and in which like reference numerals indicate like parts in the various views;

FIG. 1a is a block diagram of the shift register;

FIG. 1b is a truth table for the shift register shown in FIG. 1a;

FIG. 2 is a plot of both clock pulse series and the reply pulse designation shown in a time relation;

FIG. 4 is a block diagram of the RTL circuitry which basically comprises the Mode C encoding section. FIG. 3 and FIG. 4 are to be oriented with FIG. 3 above FIG. 4 as shown in FIG. 6 for proper interrelation.

FIG. 5a is a front view of a transponder control head having the code 0132 set thereon;

FIG. 5b is an octal to binary conversion table showing the various pulses that must be transmitted in order to transmit a specific code;

FIG. 6 is a figure orientation diagram showing the proper positioning of FIG. 3 and FIG. 4 in order to view the complete shift register, control head switches and RTL circuitry in block diagram form.

Figure 3:
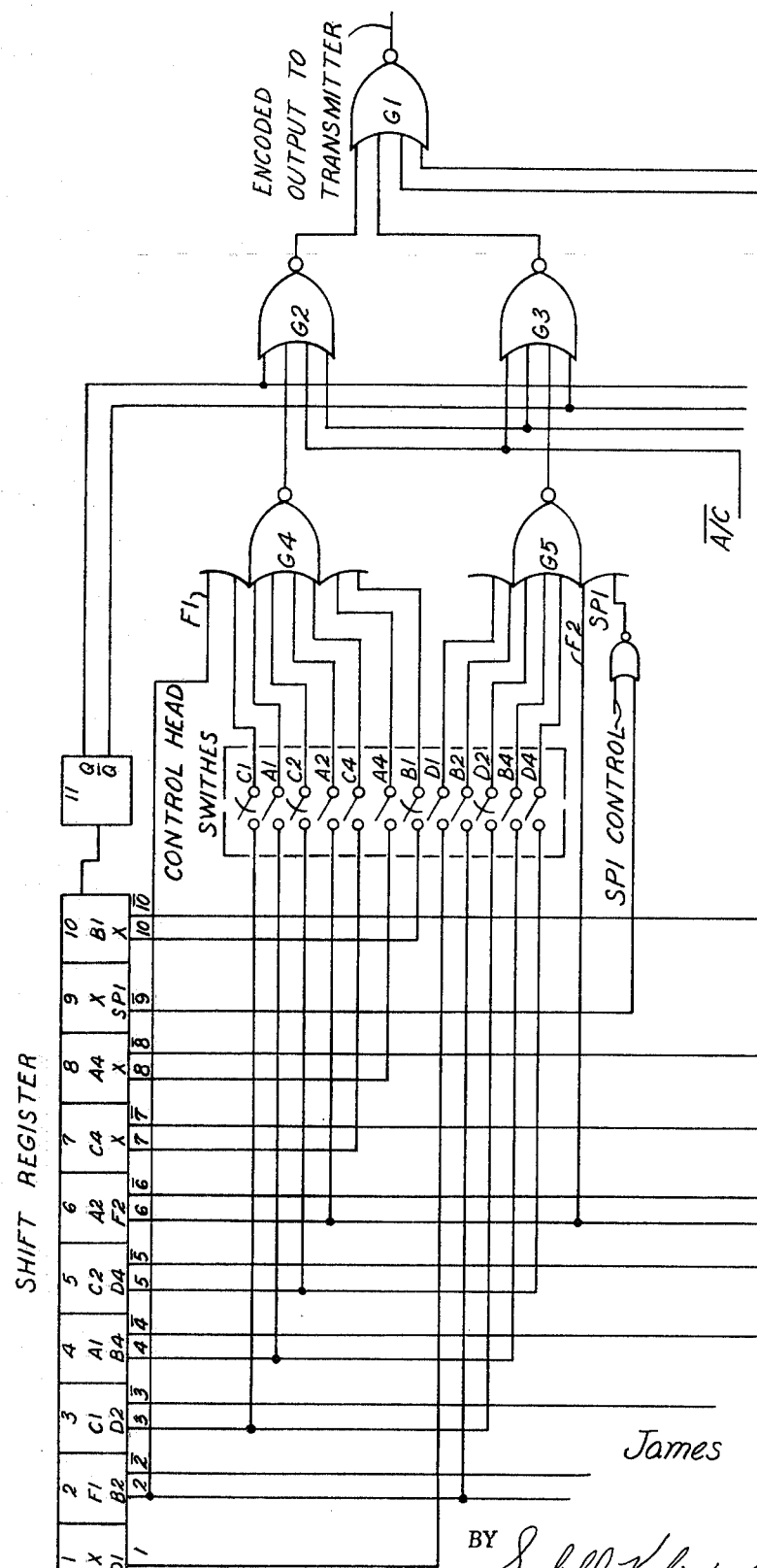
FIG. 3 is a block diagram of the shift register shown in FIG. 1a in combination with the control head switch and RTL circuitry which basically comprises the Mode A encoding section.

Referring now more to the drawings, FIG. 1a shows the shift register utilized as a part of my unique encoding circuit. This shift register is used to determine the basic timing of the system in that same plays an integral role in determining which reply code the corresponding time relationship applies between a reply pulse and a particular clock pulse. Accordingly, the clock pulses occur at a preselected time interval which may be correlated to each selectable reply pulse.

The shift register is comprised of elevent (11) JK flip-flops, each of which has four (4) different output states for each of the four (4) possible input states on the set and clear (S and C) terminals. These flip-flops are represented by the numerals 1 through 11 inclusive. The reset input to the first flip-flop (1) is designated as PS or Pre-Set Condition while the inputs to the remaining flip-flops are designated as PC or in the Pre-Clear Condition.

The output states of the various flip-flops are shown in the truth table in FIG. 1b. The Set and Clear inputs are represented by the letters S and C with the output of each flip-flop being designated as either a Q or a $\bar{Q}$. (The $\bar{Q}$ symbol is the Q output in the inverted state.) The symbol $QN+1$ designates the output of the flip-flop after the next falling edge of the clock pulse. For example, if both the S and C inputs are low, then the next state of the flip-flop (the $QN+1$) will be inverted from the state it is now in. Each of the state changes are initiated by the negative going or falling edge of a clock pulse on the clock pulse input line (see FIG. 1a). If the S (set) input is high and if the C (clear) input is low, the next state on output Q will be high no matter what state it started in thereby indicating a 1 condition. If the S input is low and the C input is high, the next state of the Q output will be low, or a 0, no matter what state it was originally in. Finally, if both the S and C inputs are high the flip-flop will stay in its original state, or its $QN$ condition.

The clock pulse train which is applied to the T terminal of flip-flops 1–10 is initiated by a reply gate or a pulse approximately 35 micro-seconds long from a one-shot multivibrator. This multi-vibrator (not shown) triggers a conventional LC oscillator circuit referred to as a burst generator. In order to obtain accurate square wave pulses from the oscillator signal, the output signal of same is impressed on a Zero Cross Over Schmitt Trigger. The Zero Cross Over Schmitt Trigger takes the oscilaltor sine wave and constructs a pulse train whose basic timing between leading edge and leading edge is 1.45 microseconds or exactly that the same timing that exists between leading edges of the various reply pulses (see FIG. 2, Reply Pulse Designation.

The basic operation of the shift register is started with a reset input pulse on the input reset line shown in FIG. 1a. The reset pulse originates in the decoding section of the transponder and sets flip-flop No. 1 to a high condition e.g. with Q at a high voltage level while all the other flip-flops, 2–11, have a low voltage Q output condition. As mentioned above, the input flip-flop 1 is referred to as PS or the Pre-Set condition while the inputs to flip-flops 2–11 are referred to as PC or Pre-Clear. The reset pulse is delivered to the shift register even before an input has been decoded in the transponder decoder section. That is to say, any pulses into the system will automatically set the encoding shift register and thereby insuring that the register is always started from the same position whenever a reply is to be transmitted. Accordingly, each flip-flop with exception of flip-flop No. 1 is set to a 0 state. Flip-flop No. 1 is set to a 1 state which will subsequently be shifted down the register (through flip-flop 2–11) with each succeeding falling edge on the clock pulse line. When the 1 is in flip-flop 10 and the next falling edge appears on the clock pulse input line, flip-flop 11 will change from a 0 state to a 1 state at the same time the 1, which was transferred out of fli-flop 10, will likewise be transferred back to flip-flop 1. The shift register is now ready to operate again for the second time, however, it should be noted that flip-flop 11 tells whether the register is being used for the first or second time. As a result, the following state table may be used to tell the state of the various flip-flops in accordance with the clock pulse number and also which state corresponds to the reply pulse.

the pulses will be transmitted; e.g. neither A1, A2, or A4; (2) B is 1, therefore the B1 pulse will be transmitted and the B2 and B4 pulses will not be transmitted; (3) The C number is 3, therefore, the C1 and C2 will be transmitted but the C4 pulse will not; and (4) The D number is 2, therefore, the D2 pulse will be transmitted but the D1 and D3 pulses will not. It is, of course, understood that the B, C, and D octal to binary conversion is identical to

| State | Flip-flop number | | | | | | | | | | | State corresponds to reply pulse |
|---|---|---|---|---|---|---|---|---|---|---|---|---|
| | 1 | 2 | 3 | 4 | 5 | 6 | 7 | 8 | 9 | 10 | 11 | |
| 0 | 1 | 0 | 0 | 0 | 0 | 0 | 0 | 0 | 0 | 0 | 0 | X |
| 1 | 0 | 1 | 0 | 0 | 0 | 0 | 0 | 0 | 0 | 0 | 0 | F1 |
| 2 | 0 | 0 | 1 | 0 | 0 | 0 | 0 | 0 | 0 | 0 | 0 | C1 |
| 3 | 0 | 0 | 0 | 1 | 0 | 0 | 0 | 0 | 0 | 0 | 0 | A1 |
| 4 | 0 | 0 | 0 | 0 | 1 | 0 | 0 | 0 | 0 | 0 | 0 | C2 |
| 5 | 0 | 0 | 0 | 0 | 0 | 1 | 0 | 0 | 0 | 0 | 0 | A2 |
| 6 | 0 | 0 | 0 | 0 | 0 | 0 | 1 | 0 | 0 | 0 | 0 | C4 |
| 7 | 0 | 0 | 0 | 0 | 0 | 0 | 0 | 1 | 0 | 0 | 0 | A4 |
| 8 | 0 | 0 | 0 | 0 | 0 | 0 | 0 | 0 | 1 | 0 | 0 | X |
| 9 | 0 | 0 | 0 | 0 | 0 | 0 | 0 | 0 | 0 | 1 | 0 | B1 |
| 10 | 1 | 0 | 0 | 0 | 0 | 0 | 0 | 0 | 0 | 0 | 1 | D1 |
| 11 | 0 | 1 | 0 | 0 | 0 | 0 | 0 | 0 | 0 | 0 | 1 | B2 |
| 12 | 0 | 0 | 1 | 0 | 0 | 0 | 0 | 0 | 0 | 0 | 1 | D2 |
| 13 | 0 | 0 | 0 | 1 | 0 | 0 | 0 | 0 | 0 | 0 | 1 | B4 |
| 14 | 0 | 0 | 0 | 0 | 1 | 0 | 0 | 0 | 0 | 0 | 1 | D4 |
| 15 | 0 | 0 | 0 | 0 | 0 | 1 | 0 | 0 | 0 | 0 | 1 | F2 |
| 16 | 0 | 0 | 0 | 0 | 0 | 0 | 1 | 0 | 0 | 0 | 1 | X |
| 17 | 0 | 0 | 0 | 0 | 0 | 0 | 0 | 1 | 0 | 0 | 1 | X |
| 18 | 0 | 0 | 0 | 0 | 0 | 0 | 0 | 0 | 1 | 0 | 1 | SPI |
| 19 | 0 | 0 | 0 | 0 | 0 | 0 | 0 | 0 | 0 | 1 | 1 | X |

It can be seen from the above state table or timing diagram that any clock pulse can be related to a reply pulse by observing the states of the shift register and by paying particular attention to flip-flop No. 11.

Turning now specifically to the encoding operation, the shift register shown in the FIG. 1a is incorporated with additional RTL circuitry for the encoding function. The shift register shown in FIG. 1a is repeated again in block form, in FIG. 3. Shown in each block (FIG. 3) are two pulse numbers which is indicative of the condition which will cause the output of the particular flip-flop to be high (or in the 1 condition). In other words, the numbers F1 and B2 in flip-flop 2 are representative of the reply code depending on whether the shift register is being used for the first or second time. When the output of flip-flop 2 is high (2 is high and $\bar{2}$ is therefore low), F1 reply pulse designation is represented as the shift register has counted down its length for the first time. The B2 reply pulse designation will be indicated by a high output condition on flip-flop 2 the second time through the shift register.

As suggested above, the shift register utilizes a plurality of NOR circuits to complete the encoding of the desired reply pulse. These NOR circuits are of a conventional design and may be thought of as a plurality of transistors having their collector circuits common to the output line of the gate. Each transistor would also have a variable input circuit at the base thereof. In this manner when all inputs to the transistor are low, (at a ground condition), all transistors will be turned off and therefore the output, if looked at through a high impedance circuit, will be high in voltage. If any one or any combination of the transistors have a high voltage input thereto, that particular transistor or transistors will be saturated pulling the output point to ground. Thusly the output of a NOR circuit is a 1 in the absence of any input signals to the various transistors and is a 0 for any of the various combinations that would have a high input to same.

Assume now that the transponder has been interrogated by the ground station and that the code of 0132 (See FIG. 5a) has been manually set into the control head of the transponder. That being the case, the A switch is in the 0 position, the B switch is in the 1 position, the C switch is in the 3 position, and the D switch is in the 2 position. From the octal-binary conversion table (FIG. 5b) it may be seen that the pulses which will be transmitted for a code 0132 are as follows: (1) A as 0, therefore none of the A number and that a similar type of table (FIG. 5a) is applicable for the B, C, and D.

Considering first the Mode A encoding section, this function is essentially accomplished by the circuitry shown in FIG. 3 which includes the shift register, the control head switches, and NOR gates G1–5. The encoding process actually originates with the first pulse that is received by the receiver in the decoder section. This first pulse will automatically reset flip-flop number 1 in the shift register to a 1 state while simultaneously setting flip-flops 2–11 to the 0 state. The actual encoding itself, however, begins when a clock trigger wave form is impressed on the input to the shift register in the manner described above with reference to the burst generator. The first falling edge of the clock pulse input, causes the 1 state in flip-flop No. 1 to be transferred to flip-flop 2. Since the first 1 condition in flip-flop 2 corresponds to the F1 or first framing pulse and since this pulse is always transmitted, flip-flop 2 is directly wired to NOR gate G4 and does not pass through the control head switches.

It should be remembered that in order to encode the 0132 numbers the control head has been manipulated to mechanically close switches C1, C2, B1, and D2 (shown in FIG. 3 by arrows pointing to the closed condition). Also, recalling the characteristics of a NOR gate 4, NOR gate G4 will have a high output when all inputs thereto are low. Therefore, as the F1 pulse appears at the input of NOR gate G4, the output of same will go low thereby causing an inverted representation of the F1 pulse to be presented at the output of the G4. This inverted or negative going pulse is then impressed on NOR gate G2 which also has a low input from the Q output of flip-flop No. 11, an input from the A/C (AC function generator), and an input from the clock pulse trigger circuit represented by the symbol $\overline{CP}$. (The $\overline{CP}$, clock pulse trigger inverted, actually shapes the output pulse from the NOR gate in that the transmitter, which is triggered on the leading edge of the output from NOR gate 2, will actually be transmitted in time coincidence with the leading edge of the clock pulse trigger. Since it is not desirable to transmit on the falling edge of clock pulse 0, it is necessary to transmit the F1 pulse on the leading edge of clock pulse No. 1. Therefore, the clock pulse trigger is ANDED against the outputs from the NOR gate G4 so that the leading edge of the output from gate No. 2 will correspond with the leading edge of the clock pulse No. 1.)

The NOR gates G2 and G3 are so arranged and interconnected with the remainder of the encoding section that they interpret which time (either first or second) that the shift register is being used. For example, the first time down the shift register, the Q output from flip-flop 11 will be low thereby relegating the output from gate G2 to be high level if the output from gate G4 is low. If the Q output from flip-flop 11 is low (ignoring temporarily the effects of the $\overline{AC}$ and the $\overline{CP}$ inputs) then the negative going input pulse from gate G4 will be represented as a positive going pulse at the output of gate G2. Furthermore, since the $\overline{Q}$ (the Q inverted pulse) output of flip-flop 11 is high and since it is applied to the input of gate G3, there will be no output from gate G3 with the $\overline{Q}$ output from flip-flop No. 11 at its present state. It therefore follows that, with the F1 pulse being an inverted negative going pulse when applied to gate G2 in combination with the low Q input from flip-flop 11, the output of gate G2 will present a positive going pulse to the input of gate G1. Since the other inputs to gate G1 are assumed to be in a low voltage condition, the positive pulse from gate G2 is inverted therethrough so that the transmitter is triggered off the falling edge of the inverted pulse through gate G1.

Returning now to the other above-mentioned inputs to NOR gate G2 identified as $\overline{CP}$ and $\overline{A/C}$, the $\overline{A/C}$ input is a control function that is generated in the decoding portion of the transponder. This function tells the encoder whether a Mode A or a Mode C reply should be encoded. When a Mode A reply is to be encoded, the $\overline{A/C}$ input will be low which will allow the signals to pass through gates G2 and G3. If the $\overline{A/C}$ input is at a high level, no signal would pass through either of the two gates and therefore there would be no input from the Mode A encoding section of the transponder. The $\overline{CP}$ pulse operates as suggested above to AND the outputs of gate G4 through gate G2 when applicable so that the decoded pulses maintain a timed coherence with the clock pulse train.

Since the B2 switch (control head switch) is not closed to encode the 0132 code, the operation of flip-flop 2 does not affect either gate G5, G3 or the above-described functioning of final gate G1.

The occurrence of the falling edge of the clock pulse indicated by the numeral 1 in FIG. 2 causes the 1 state to be moved from flip-flop 2 to flip-flop 3. The 1 state in flip-flop 3 (the 3 output) coincides to a C1 pulse and is transmitted through the closed C1 switch in the control head to NOR gate G4. The same pulse is also applied through closed control head switch D2 to NOR gate G5. Accordingly, both NOR gates G4 and G5 will have outputs which are the negative going representation of the pulse produced by flip-flop 3.

The above-mentioned outputs are applied to NOR gates G2 and G3, respectively. It should be noted that the only pulse which is allowed to pass through to gate G1 is the output pulse from gate G4. This is because gate G2 has an input from flip-flop 11 (the Q "input") in addition to the input from gate G4. Since the Q input at this stage in the encoding process is low, gate G2 will be enabled and the pulse from gate G4 is allowed to pass therethrough. The G5 pulse, however, cannot pass through gate G3 because the $\overline{Q}$ pulse from flip-flop 11 is high thereby effectively blocking the pulse out of gate G5.

The next falling edge (corresponding to clock pulse No. 2) moves the 1 condition to flip-flop 4. The 4 output which would correspond to the A1 pulse is delivered to the control head and impressed upon the A1 and B4 switch contacts. Since both of these switches are open this pulse is not transferred to either NOR gate G4 or G5 and therefore will not be transmitted in any form.

The clock pulse identified by the numeral 3 operates via its falling edge to shift the 1 condition from flip-flop No. 4 to flip-flop No. 5. The 1 condition represented by numeral 5 is delivered through control head switch C2 (which has been closed for encoding purposes) to NOR gate G4. This pulse is again transferred through NOR gates G2 and G1 and finally to the transmitter as described above. The pulse out of shift register 5 has also impressed upon the open control head switch contacts D4 and is likewise precluded from having an operative effect on NOR gates G5 and G3.

The occurrence of the falling edge of clock pulse No. 4 shifts the 1 condition to flip-flop 6 and again this output is impressed upon the control head switch A2 which is open. As a result no pulse is transmitted to NOR gate G4. However, it should be noted that the pulse condition out of flip-flop 6 is wired directly to NOR gate G5 and is designated as the F2. The F2 pulse will be represented by a negative going output from NOR gate G5 and will be impressed upon NOR gate G3. This gate 5 output is rendered ineffective by the still present condition of $\overline{Q}$ from flip-flop No. 11. The $\overline{Q}$ output, which is high, saturates the output of gate 3 so that no pulse will be transmitted to gate G1 and on to the transmitter at this time.

The next falling edge of the clock pulse train (the falling edge of the clock pulse 5) shifts this 1 state from flip-flop 6 to flip-flop 7 and the output thereof is singly and ineffectively impressed upon the open control head switch C4. As the clock pulse 6 shifts the 1 state from flip-flop 7 to flip-flop 8, the 8 output is applied to another open control head switch A4. Clock pulse 7 operates to move 1 condition from flip-flop 8 to flip-flop 9. Here the output of flip-flop 9 is directly wired to the SPI control gate. If the signal on the SPI control wire is low, the 9 pulse will be applied through the SPI gate to NOR gate G5 as a positive pulse. This pulse is then transmitted out of NOR gate 5. The output of NOR gate G5 is a negative pulse, when same is then delivered to NOR gate G3. Again, however, NOR gate G3 is turned off by the high condition of the $\overline{Q}$ from flip-flop 11 and no SPI pulse will be transmitted this time.

The occurrence of the falling edge of the clock pulse No. 8 shifts the 1 state to flip-flop No. 10. The 10 output is impressed directly on the closed B1 switch and therefore upon NOR gate G4. This produces a negative going pulse output from gate G4 with same being impressed on the input of NOR gate G2. In this situation, gate G2 is enabled by the low condition of the Q output from flip-flop 11 so that a positive output pulse will be delivered from NOR gate G2 which has a leading edge corresponding to the leading edge of the clock pulse trigger (CP) therefore triggering the transmitter in time coherence.

The occurrence of the falling edge of the clock pulse 9 results in two significant operations. First, the 1 state in flip-flop 10 is transferred back to flip-flop 1. At the same time, the output of flip-flop 11 changes from the 0 state to the 1. The output of flip-flop 1 is applied to the open control head switch D1 thereby precluding a transmission of same. The next falling edge of the clock pulse series (clock pulse 10) shifts the 1 state from flip-flop 1 to flip-flop 2. The output of flip-flop 2 is again applied to NOR gate G4 on the F1 line and to the open B2 switch in the control head. The condition of the B2 switch, of course, precludes further operation of the pulse on NOR gate G5. The positive going pulse, which is applied to NOR gate G4 via the F1 line, appears as a negative going output from gate G4, the same being then applied directly to gate G2. Now however, the Q output from flip-flop 11 is high thereby keeping the output from gate G2 low so that this pulse will not be transferred to the transmitter.

The falling edge of clock pulse 11 moves the 1 state from flip-flop 2 to flip-flop 3. The 3 output is passed through the closed control head switch C1 and is applied to NOR gate G4. The same pulse also passes through closed switch D2 to NOR gate 5. As a result, there will be negative going pulses out of both gates G4 and G5 which are applied to gates G2 and G3, respectively. It may now readily be seen that: (1) NOR gate G2 has been disabled due to the high condition of the Q output from flip-flop G11 and (2) that gate G3 is enabled by the low condition of the $\overline{Q}$ output from the same flip-flop. Therefore, the only pulse that is impressed on the final NOR gate G1 and directed therethrough to the transmitter will be the B2 pulse.

The occurrence of the falling edge of clock pulse, represented by the numeral 12, shifts the 1 state to flip-flop G4. The output is again impressed on the open control head switch contact A1 and on the open B4 switch. As a result, neither of the NOR gates G4 and G5 have the necessary input for transmission at this time. The falling edge of clock pulse 13 shifts the 1 state from flip-flop 4 to flip-flop 5. The positive going pulse from flip-flop 5 is applied through closed control head switch C2 to NOR gate G4 and to the open control head switch B4. Of course, no pulse is applied to NOR gate G5. The output from NOR gate G4 forms a negative going pulse which is impressed on gate G2 but it is not transferred to gate G1 due to the disabling effect of the Q output (at a high level) from flip-flop 11.

The falling edge of clock pulse 14 transfers the 1 state to flip-flop No. 6 and accordingly impresses the positive going pulse on the open switch A2 thereby having no effect on NOR gate G4. This positive going pulse is also represented as the F2 pulse and is applied directly to NOR gate G5. As a result, gate G5 has a negative going output which will pass through NOR gate G3, to be inverted, and trigger the transmitter since NOR gate G3 has been enabled due to the low condition of the $\overline{Q}$ input from flip-flop 11.

The next falling edge on the clock pulse line (clock pulse 15) shifts the 1 state to flip-flop 7 whose output is ineffective in that control head switch C4 is open. Obviously, this pulse will not be utilized at the present time. The falling edge of clock pulse 16 shifts the 1 state to flip-flop No. 8, however, its associated control head switch (A4) is likewise open and therefore not used at this time.

The 17th clock pulse results in the shifting of the 1 state from flip-flop 8 to flip-flop 9. At this time, the 9 inverted ($\overline{9}$) output is delivered to the SPI gate. If the SPI control is low, an inverted output (9) will be applied to NOR gate G5 which will have a negative going output therefrom to NOR gate G3. Since the $\overline{Q}$ output from flip-flop 11 is low, NOR gate G3 is enabled and the SPI pulse will be delivered to the transmitter for transmission. The next falling edge from the clock pulse on the clock pulse line shifts the 1 state to flip-flop 10. This pulse, however, is never used under these circumstances. This is an extra pulse due to the fact that there exists 2 times 10 (the 10 states) or 20 available conditions even through only 19 are actually needed.

From the above, it may be assumed that NOR gate 1 will have, at any one time, only one of the four inputs thereto with a positive going pulse on same. This is due to the fact that the four inputs represent two inputs from the Mode A section and two inputs from the Mode C section. As only one of the two possible modes will be transmitted at any one time, two of the four inputs will be low. Of the two remaining inputs, one of same will always be low due to the "blocking" or "disabling" effect of the Q or $\overline{Q}$ outputs from flip-flop 11. It therefore follows, that in any particular operation, gate G1 acts as an inverter for the input containing the positive going pulse therein.

Referring to FIG. 4, the Mode C encoding section, it can be seen that the two encoding sections are somewhat similar. One of the main differences between the two sections is the relationship of the A/C input signal to NOR gates G6 and G7. From the drawing, it may be seen that when the A/C input is low, signals are permitted to pass through gates G6 and G7 if the output conditions from Q and $\overline{Q}$ will allow it. Since the Mode A and Mode C encoding sections are controlled by the $\overline{A/C}$ or A/C respectively, only one section may be utilized at any one time. When the A/C input is low, then a Mode C type code will be transmitted since NOR gates G6 and G7 will be enabled. Of course, at the same time, the $\overline{A/C}$ input will be high obviating the utilization of the Mode A encoding section since NOR gates G2 and G3 are disabled. Also when the $\overline{A/C}$ input is low the Mode A section is enabled and the Mode C section disabled.

The effective use of the $\overline{CP}$ signal (clock pulse inverted) is used for shaping the output pulse in the Mode C encoding as was described above with reference to Mode A. Thus, one of the more apparent differences between Mode C and Mode A encoding lies in the utilization of the control head switches. In the Mode C operation, the control head switching functions are taken over by NOR gates 10 through 19. Each of these NOR gates (10–19) has two inputs thereto. One input to each of the various NOR gates is the inverted output from its associated shift register flip-flop. The other input to each gate is a control wire which comes from the encoding altimeter in the aircraft.

In operation, the altimeter control wire to a particular NOR gate will be grounded when the associated pulse is to be transmitted, that is, if the C1–A line is grounded, then the C1 pulse will be transmitted in that reply. For instance, with line C1–A being grounded, the inverted output ($\overline{3}$) from flip-flop 3 will be impressed on NOR gate G10. Gate G10 also acts as an inverter and delivers same to NOR gate G8 as a positive pulse. This positive pulse is then transmitted through NOR gates G–6 and G–1 to the transmitter.

If line C1–A had not been grounded, then current would flow from the +V voltage source through the associated resistor to the C1–A line and saturate that particular transistor in NOR gate G–10. This, of course, means that the output from gate G–10 would be low no matter what condition the other input line (the $\overline{3}$) would take on and therefore the pulse would not be transmitted.

The remaining NOR gates (gates G–11–G–19) operated in a similar manner with their associated control wires. For instance, control wires A1–A, C2–A, A2–A, C4–A, A4–A, B1–A, B2–A, B4–A, and D4–A, operate to either enable or disable gates G–11, G–12, G–13, G–14, G–15, G–16, G–17, G–18, and G–19, respectively. The framing pulses F–1 and F–2 are operatively associated with NOR gates G–8 and G–9, and operate in a similar manner as did the same pulses in conjunction with gates G–4 and G–5. Neither of the two framing pulses have associated control wires, however their transmission is generally dependent upon the state and condition of flip-flop 11. For instance, the particular level of the Q output of flip-flop 11 controls the operation of NOR gate G–6 in the same manner that it controls the operation of gate G–2. Likewise, the condition of the $\overline{Q}$ output of flip-flop 11 controls the operation of gate G–7, as it controlled the operation of G–3 and its associated framing pulse. It is therefore seen that the F1 and F2 pulses are always present in any particular reply however the condition of gates G6 and G7 dictate whether or not they will be transmitted.

It should be pointed out that while decreasing the number of components in the encoding section of the transponder and the special gating techniques disclosed above have enabled the transponder to be panel mounted in general aviation aircraft, the use of the control head switches could be approximated by ground wires and two terminal NOR gates similar to gates G–10 through G–19 if a special design were required. However, the preferred embodiment of the subject encoder section and the transponder is to utilize the control head switches and panel mount the transponder as mentioned above.

From the foregoing, it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations. This contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. In an improved aircraft traffic control transponder having a receiver, a decoder, an encoder, and a transmitter, said transponder operable to receive an interrogation from an ATC ground station, decode the interrogation, encode a correct reply code, and then transmit said encoded reply code to said ATC station, the improvement comprising, said encoder including
means for producing a series of clock pulses having a preselected time period,
means for time correlating a plurality of transmittable pulses with said clock pulse series, said correlating means including,
a shift register,
means for applying said clock pulses to said shift register, said shift register having the capability of counting said clock pulses through its capacity more than once for each encoded reply code, and
means interconnected with said shift register for selecting certain ones of said pulses for transmission as an encoded reply code to said ATC ground station after time correlating same with said clock pulse series.

2. The invention as in claim 1 wherein said selecting means includes a plurality of control head switches interconnected with said shift register, a plurality of gate circuits interconnected with said control head switches and operable as a portion of said selecting means to select certain ones of said pulses for transmission as an encoded reply code, said control head switches and said gate circuits being further operable to be enclosed within a single housing and panel mounted within an aircraft.

3. The invention as in claim 2, wherein said shift register is comprised of a plurality of concatenated flip-flops, and wherein said correlating means includes a means for indicating whether the shift register is counting said pulses through same for the first time.

4. The invention as in claim 3, wherein said indicating means includes a flip-flop circuit having two possible output states, said states being operable to control the gating of said selected pulses through said gate circuits.

5. The invention as in claim 3, wherein each one of said control head switches is connected to a particular shift register flip-flop, said switches controlling the selection of certain ones of said pulses for transmission as an encoded reply code to said ATC ground station.

6. The invention as in claim 1, wherein said shift register is comprised of a plurality of concatenated flip-flops, a plurality of gate circuits interconnected with said flip-flops, a first portion of said gate circuits controlling the transponder's operation for Mode A encoding, said first portion of said gate circuits passing selected pulses from said flip-flops to said transmitter for transmission to said ATC ground station as a Mode A reply code.

7. The invention as in claim 6, wherein said encoder includes a plurality of control head switches connected to a particular shift register flip-flop, said switches having selectable control over the transmission of said pulses from said shift register to said gate circuits.

8. The invention as in claim 6, wherein a second portion of said gate circuits control the transponder's operation for Mode C encoding, said second portion of said gate circuits passing selected pulses from said flip-flops to said transmitter for transmission to said ATC ground station as a Mode C reply code.

9. The method of encoding a reply code to an ATC ground station, said method comprising the steps of:
producing a series of clock pulses having a preselected time period,
using a shift register more than once to correlate a plurality of transmittable pulses with said clock pulses, and
selecting certain ones of said pulses for transmission as an encoded reply code to said ATC ground station.

10. The invention as in claim 9 including the step of selectably gating time correlated pulses from said shift register for transmission as said reply code.

11. The invention as in claim 9 including the steps of indicating if said shift register has been used more than once, and gating certain ones of said correlated pulse for transmission as said reply pulses as a function of said indication.

12. The invention as in claim 9 including the step of passing pulses from said shift register through selectable control head switches for transmission as said reply code.

13. The invention as in claim 12 including the steps of gating said pulses selected by said control head switches for transmission as said reply code.

References Cited

UNITED STATES PATENTS 3,163,860  12/1964  Bailey.
3,341,845   9/1967  Deman.
3,341,846   9/1967  McMurren et al.

RODNEY D. BENNETT, Primary Examiner

M. F. HUBLER, Assistant Examiner